No. 793,079. PATENTED JUNE 27, 1905.
G. A. INGERSOLL.
PIPE STEM CLEANING DEVICE.
APPLICATION FILED MAY 28, 1904.
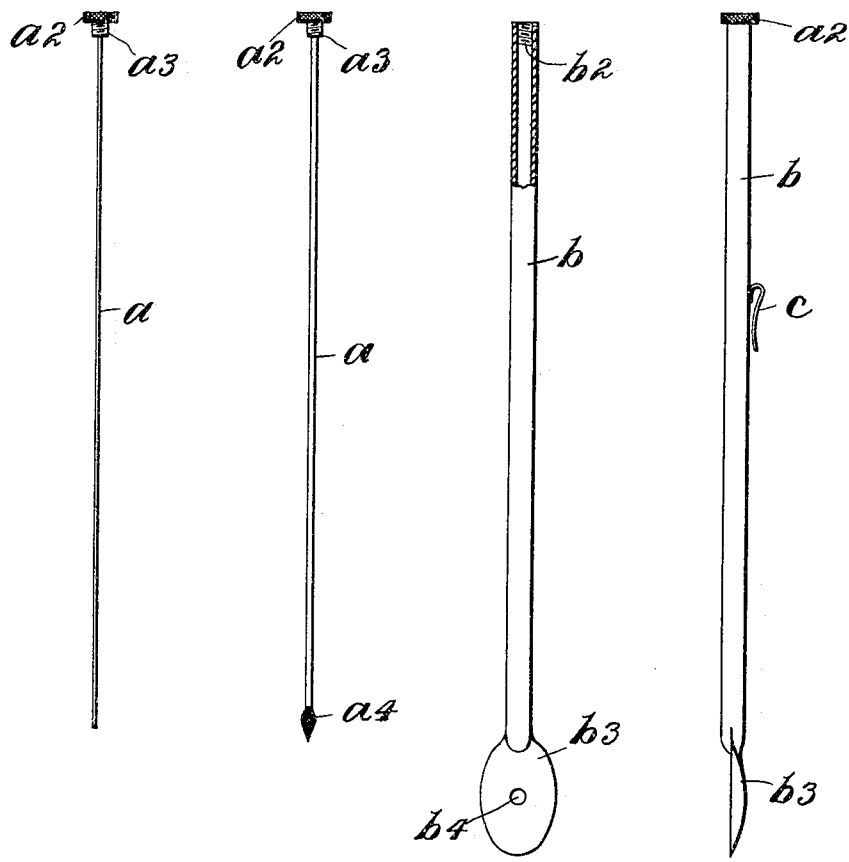

No. 793,079.

Patented June 27, 1905.

UNITED STATES PATENT OFFICE.

GEORGE ALBERT INGERSOLL, OF WHITESTONE, NEW YORK.

PIPE-STEM-CLEANING DEVICE.

SPECIFICATION forming part of Letters Patent No. 793,079, dated June 27, 1905.

Application filed May 28, 1904. Serial No. 210,179.

*To all whom it may concern:*

Be it known that I, GEORGE ALBERT INGERSOLL, a citizen of the United States, residing at Whitestone, Long Island, in the county of Queens and State of New York, have invented certain new and useful Improvements in Pipe-Stem-Cleaning Devices, of which the following is a specification, such as will enable those skilled in the art to which it appertains to make and use the same.

This invention relates to tobacco-pipes and improvements for cleaning the stem thereof; and the object of the invention is to provide an improved device of this class which may also be used for cleaning the bowl of the pipe.

The invention consists in a fine blade, which is adapted to be inserted into or through the stem of a pipe and turned or manipulated so as to thoroughly clean said stem, and a tubular shield into which said blade may be inserted when not in use.

The invention is fully disclosed in the following specification, of which the accompanying drawings form a part, in which the separate parts of my improvement are designated by suitable reference characters in each of the views, and in which—

Figure 1 is a side view of the stem-cleaning blade which I employ; Fig. 2, a similar view showing a modification; Fig. 3, a view similar to Fig. 1, showing the tubular shield, which is partly in section; and Fig. 4, a view at right angles to Fig. 3 and showing the complete device, the blade being inserted into the shield.

In the practice of my invention I provide a fine, narrow, and thin blade $a$, provided at one end with a mill-head $a^2$, having a screw-threaded hub $a^3$, in which the blade $a$ is secured. The blade $a$ is made of elastic material, and in practice when it is desired to clean the stem of a pipe this blade is inserted into and through said stem and is turned so as to thoroughly clean the stem, the contents thereof being removed with the blade. I also provide a tubular shield $b$, one end of which is screw-threaded interiorly, as shown at $b^2$ in Fig. 3, and into this shield in practice the blade $a$ is inserted when not in use, the hub $a^3$ of the mill-head $a^2$ being screwed into the screw-threaded end of the tubular shield, and in Fig. 4 the parts are shown connected, or the blade $a$ is inserted into the shield. The shield $b$ is preferably provided at the end opposite the screw-threaded end with a spoon-shaped device $b^3$, which is intended for use in cleaning the bowl of a pipe, and this spoon-shaped device is preferably provided with a central hole $b^4$, by which the complete article may be suspended from a hook or other device. I also preferably provide the shield $b$ with a pointed hook $c$, by which the complete device may be suspended from the lining of a coat or from any other support with which the hook $c$ can be engaged.

In Fig. 2 I have shown a modification of the blade $a$, in which said blade is provided at its pointed or smaller end with a small bulb or head $a^4$, preferably tapered at both ends and provided with a roughened or serrated surface, which will facilitate, under certain circumstances, the cleaning of the stem of a pipe, the head $a^4$ serving to push any foreign substances through the stem or aiding in pulling the same out with the blade $a$. The blade $a$ may be of any desired elastic material and may be made of fine wire, if desired, said wire being preferably flattened, so as to provide longitudinal edges therefor, and the head $a^4$ may be made spoon-shaped, if desired.

By means of this device a pipe-stem may be thoroughly cleaned whenever desired; but my invention is not limited to the exact construction herein shown and described, and I reserve the right to make all such alterations therein as fairly come within the scope of the invention.

Having fully described my invention, what I claim as new, and desire to secure by Letters Patent, is—

1. A device of the class described, comprising a tubular shield one end of which is screw-threaded interiorly, and a fine elastic blade adapted to be inserted into said shield and provided at one end with a head having a screw-threaded hub to which said blade is secured, said shield being also provided at the end thereof opposite the threaded end with a spoon-shaped attachment, substantially as shown and described.

2. A device of the class described, comprising a tubular shield one end of which is screw-threaded interiorly, and a fine elastic blade adapted to be inserted into said shield and provided at one end with a head having a screw-threaded hub to which said blade is secured, said shield being also provided at the end thereof opposite the threaded end with a spoon-shaped attachment, and said shield being also provided with a hook-shaped suspending device, substantially as shown and described.

3. A device of the class described, comprising a tubular shield one end of which is threaded interiorly and the other end closed, and a fine elastic blade adapted to be inserted into said shield and provided at one end with a head having a screw-threaded hub to which said blade is secured, said blade being also provided at the opposite end with an enlarged bulb, substantially as shown and described.

In testimony that I claim the foregoing as my invention I have signed my name, in presence of the subscribing witnesses, this 25th day of May, 1904.

GEORGE ALBERT INGERSOLL.

Witnesses:
LAURENCE D. LARK,
JOSEPH KEARNEY.